United States Patent [19]
Arsenault

[11] Patent Number: 6,007,278
[45] Date of Patent: Dec. 28, 1999

[54] DEVICE FOR MACHINING AN INTERIOR SURFACE OF A TUBULAR OBJECT

[75] Inventor: Donald Arsenault, Westport, Mass.

[73] Assignee: The United States of America as represented by the Secretary of the Navy, Washington, D.C.

[21] Appl. No.: 08/706,589

[22] Filed: Sep. 5, 1996

[51] Int. Cl.⁶ .................................................. B23B 45/14
[52] U.S. Cl. .............................. 408/79; 408/87; 408/102; 408/111; 408/112; 408/234; 408/712; 409/175
[58] Field of Search ........................... 408/102, 110–112, 408/77, 72 R, 712, 79, 87, 99, 100, 234, 241 R; 409/175, 177, 178, 299, 307

[56] References Cited

U.S. PATENT DOCUMENTS

| | | | |
|---|---|---|---|
| 1,118,268 | 11/1914 | Coates | 408/100 |
| 3,464,313 | 9/1969 | Shay et al. | 409/178 |
| 3,618,463 | 11/1971 | Briney et al. | 409/178 |
| 4,494,895 | 1/1985 | Leaf | 408/712 |
| 4,850,763 | 7/1989 | Jack et al. | 409/175 |
| 5,046,903 | 9/1991 | Nagayoshi et al. | 408/79 |

*Primary Examiner*—Steven C. Bishop
*Attorney, Agent, or Firm*—Michael J. McGowan; James M. Kasischke; Prithvi C. Lall

[57] ABSTRACT

Disclosed is a device for use in machining an interior surface of a tubular object which comprises a pair of rails that can be longitudinally installed through the interior section of the tubular object. Braces join the rail for fixing the rails to the tubular object. A platform is movably mounted on the rails to allow longitudinal movement of the platform. A machine tool can be mounted on the platform.

15 Claims, 3 Drawing Sheets

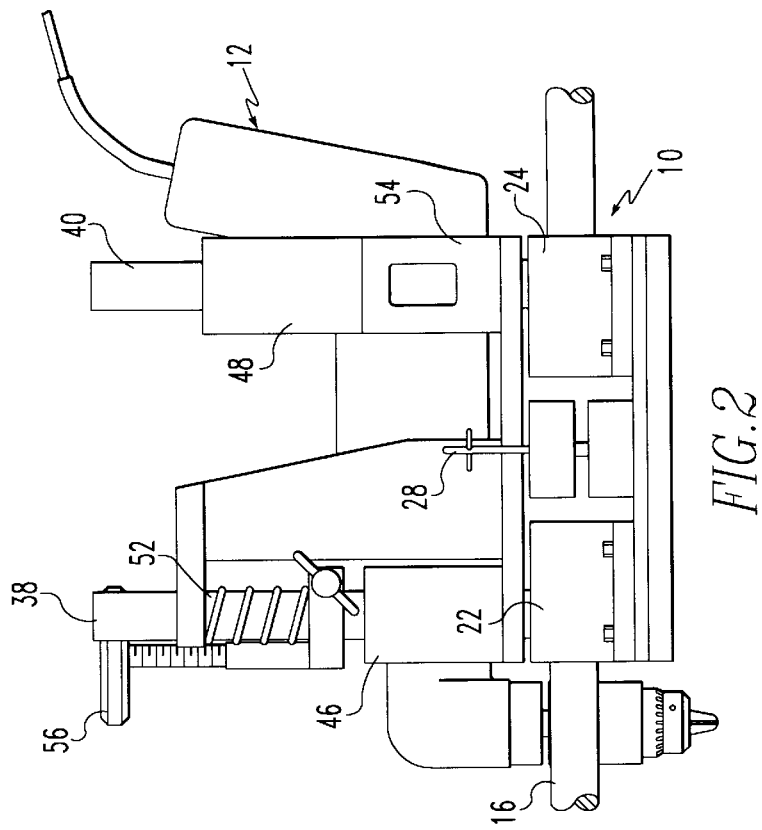
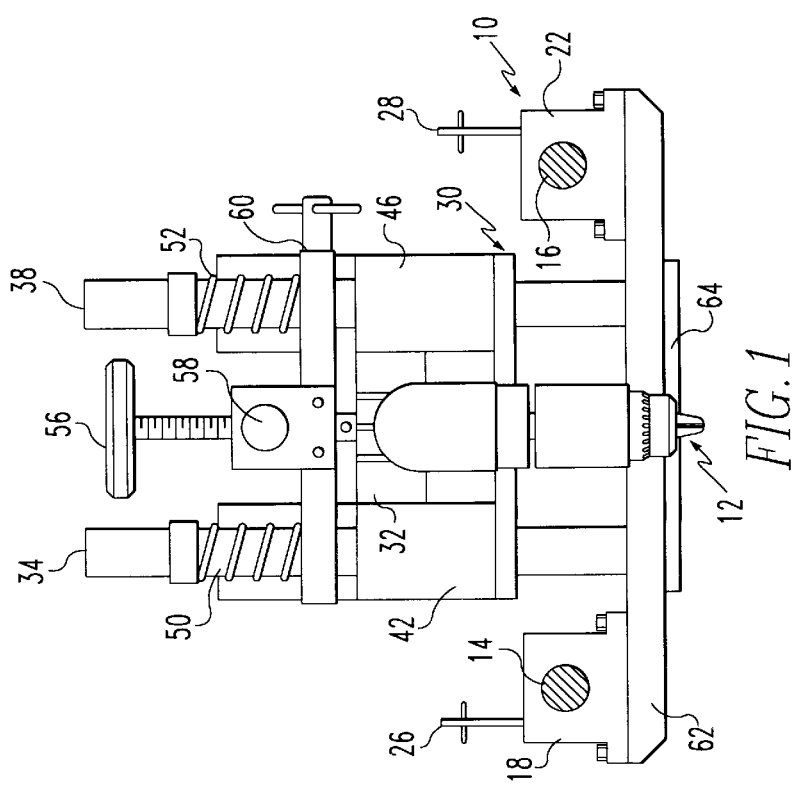

DEVICE FOR MACHINING AN INTERIOR SURFACE OF A TUBULAR OBJECT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to work platform assemblies and more particularly to such assemblies which may be used to machine the interior surface of a tubular object.

(2) Description of the Prior Art

Various devices are disclosed in the prior art for providing access to cylindrical tubular recessed work surfaces. For example:

U.S. Pat. No. 3,058,543 to Prosser discloses a portable scaffold deployed in a vessel. This apparatus makes use of a radially extendable stabilizing arms and expandable width grating.

U.S. Pat. No. 3,870,122 to Faucheux discloses a catwalk that spans the circumference of a dome structure. The apparatus includes a roller track at the end of the catwalk on the side of the roller track which is movable thereon.

U.S. Pat. No. 3,960,242 to Saxonmeyer discloses an orbital service bridge for positioning a work platform at desired positions within an overlying dome shaped structure. Included in the apparatus is a polar crane which has parallel guide rails spanning a cylindrical vessel.

U.S. Pat. No. 5,067,589 to Bartnicki discloses an extendable platform in which two platform sections can be nested or moved apart from one another to increase platform length.

U.S. Pat. No. 5,301,770 to Regan et al. discloses an adjustable work platform assembly for the inside c)f a vessel. The platform is suspended from above and is extendable and collapsible to fit the various diameters of the vessel.

A need, however, exists for a device which can easily machine the interior surface of a tubular cylindrical recessed surface.

SUMMARY OF THE INVENTION

A first object of the invention is the provision of a device for mounting a machine tool inside a cylindrical object to machine the inner surface of the object.

A second object of the invention is that such device be capable of mounting the tool anywhere, radially or longitudinally, along the inner surface.

Another object of the invention is that such device be portable and configurable to a variety of objects.

Accordingly, the device of the present invention provides means for machining the interior surface of a generally tubular object. This device comprises a rail which extends interiorly through the tubular object. At opposed ends of the rail are braces which fix the rail to the tubular shaped object. A platform is movably mounted on the rail so as to be able to interiorly traverse the tubular object. A machining means such as a drill is mounted on the platform. By means of this device, the machining means can traverse the tubular object longitudinally on the rails or can be set to different angular positions by virtue of bearings positioned at opposed ends of the braces.

BRIEF DESCRIPTION OF THE DRAWINGS

The present invention will be more fully understood when the following description is read in light of the accompanying drawings in which:

FIG. 1 is a front elevational view of the machining device of the present invention;

FIG. 2 is a side elevational view of the machining device shown in FIG. 1;

DETAILED DESCRIPTION OF THE PREFERRED EMBODIMENT

Figure 3:
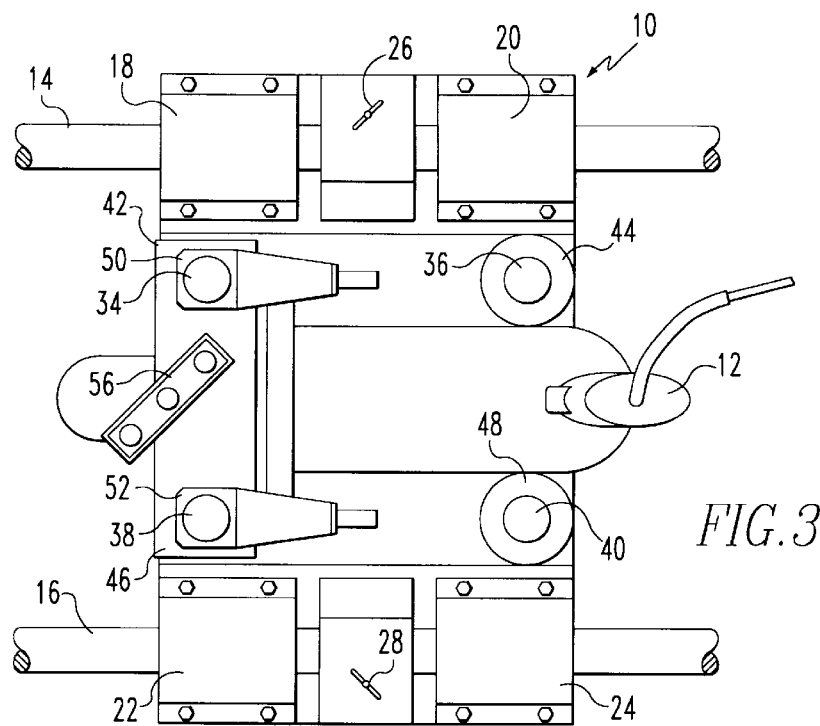
FIG. 3 is a top plan view of the machining device shown in FIG. 1.

Referring to FIGS. 1–3, it will be seen that the device of the present invention includes a platform shown at numeral 10 on which there is a drill shown at numeral 12 superimposed. The platform 10 is mounted on rails 14 and 16 in a manner to be described later. The mounting includes linear pillow blocks 18, 20, 22 and 24, having apertures therein through which the rails 14 and 16 pass. There are also carriage locks 26 and 28 for locking the platform on the rail. More specifically, the platform includes an upper base 30 on which there is mounted a drill mounting block 32. Mounted on the upper base 30 are vertical travel ground shafts 34, 36, 38 and 40. Positioned adjacent these ground shafts 34, 36, 38 and 40 there are flanged linear bearings 42, 44, 46 and 48, spring return assembles 50 and 52, and spacers 54. Height adjustment lock 60 secures the position of the upper base 30 away from or toward the interior surface of the tubular object to provide an appropriate location for the drill 12. This height adjustment is needed to accommodate various cutting tool lengths. When an appropriate position is reached, height adjustment lock 60 is secured, allowing drill 12 to be fed vertically against spring assembly 50, 52 be means of a feed screw 56. Spring assembly 50, 52 allows automatic retraction of tool from tubular object when feed screw 56 is turned counterclockwise. The platform 10 also includes a lower base 62 and a post retainer 64.

Figure 4:
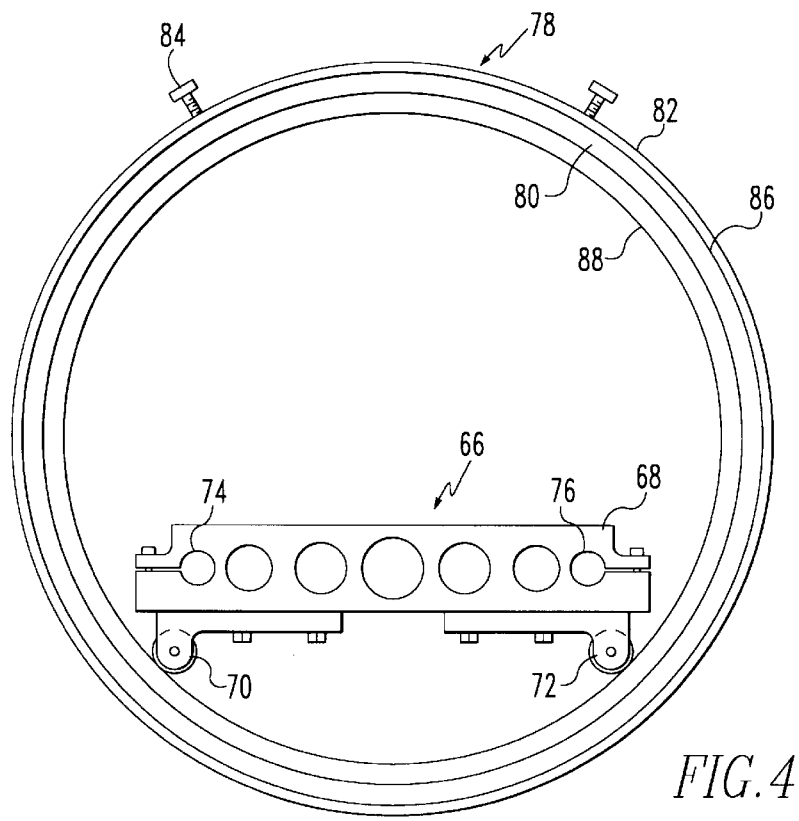
FIG. 4 is an end view of a tubular object in which the machining device shown in FIGS. 1–2 may be mounted along with a bracing means for mounting that device therein.

Referring to FIG. 4, it will be seen that the device also includes a brace 66 having an elongated brace body 68 which has bearings 70 and 72 at its opposed ends. In the brace 66 there are also rail receiving apertures 74 and 76 by means of which the brace 66 is engaged to the rails and thereby to the platform. Also shown in FIG. 4 is a tubular object shown generally at numeral 78. This tubular object is comprised of a shell 80, a degree ring 82 and locking screws 84 to attach shell 80 to the degree ring 82. For definitional purposes it will be understood that the tubular object 78 has an exterior peripheral surface 86 and an interior peripheral surface 88. The tubular object can be any one of a large variety of tubular, cylindrical or recessed structures; however, this device was designed for use with a torpedo shell of about 21 inches in diameter.

Figure 5:
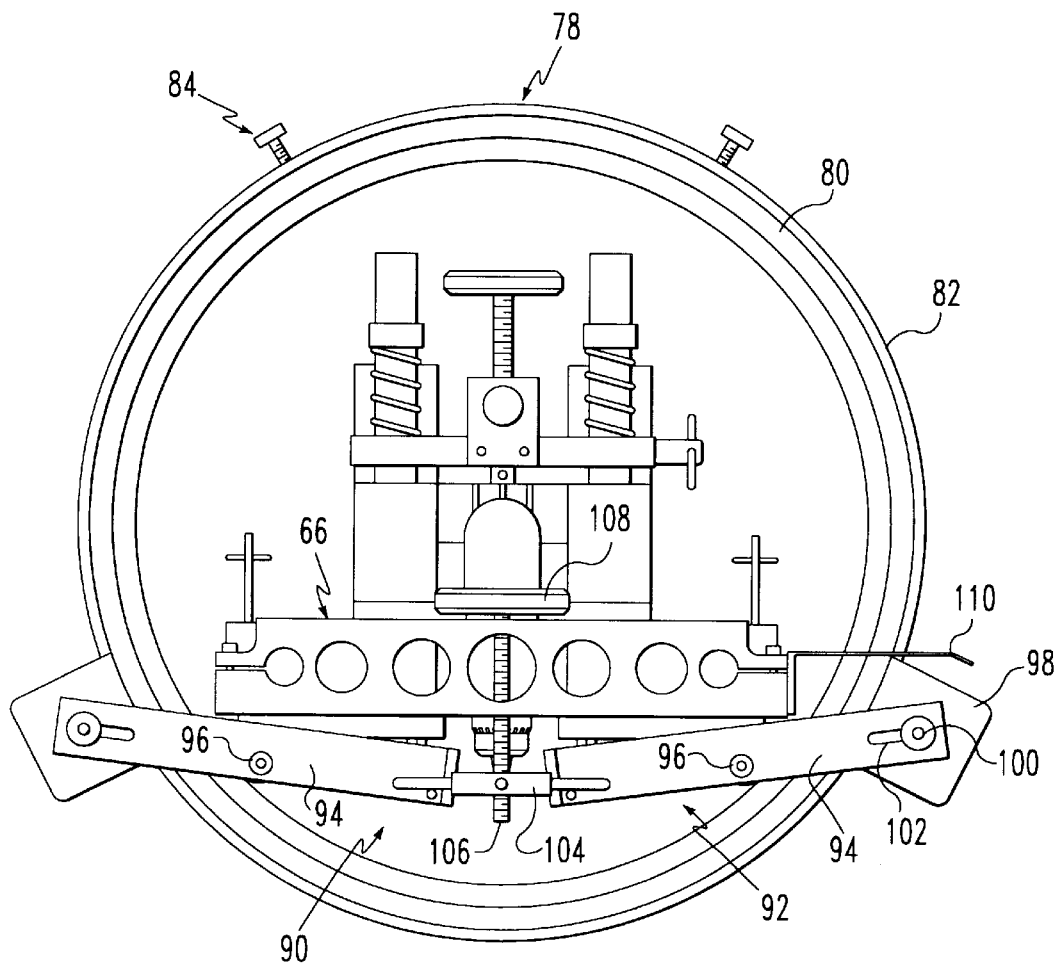
FIG. 5 is another end view of the tubular object and bracing member shown in FIG. 3 with the machining device shown in FIGS. 1–2 mounted therein.

Referring to FIG. 5, the brace 66 is fixed to the tubular object 78 by means of lock mechanisms which are shown generally at numerals 90 and 92. Each of these lock mechanisms 90 and 92 has a lock arm 94 which is attached to the brace 66 by a pivot nut 96. At the exterior end of each lock arm 94, there is a lock shoe 98 which is attached to the lock arm by a lock shoe nut 100 which moves in a slot 102 on the lock arm 94 to allow adjustment of lock shoe 98. At the opposed end of the lock arm 94 there is a lock nut and trunnion assembly 104 which is connected to a lock screw 106 having a lock screw head 108. By adjustment of this lock screw 106, the interior end of the lock arm 94 can be moved radially away from the brace means to tighten the lock shoe 98 on the exterior side of the tubular object 78, or can be moved toward the brace 66 to loosen the lock shoe 98 on the exterior surface of the tubular object 78. When the lock shoe 98 is loosened, it will be appreciated that the entire assembly can be moved peripherally around the tubular object 78 so that any portion of its interior surface may be machined. A degree pointer 110 is also provided to facilitate the correct angular positioning of the assembly.

It will be appreciated that a device has been provided which allows for the efficient and inexpensive machining of interior surfaces of tubular objects.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A device for use in machining an interior surface of a generally tubular object comprising:
   a rail means extending interiorly through said tubular shaped object;
   a brace means positionable in a plurality of angular positions on the interior surface of the tubular object for fixing the rail means to the tubularly shaped object;
   a platform means movably mounted on said rail means to be interiorly traversable through said tubularly shaped object, said platform having a machining means mount object thereon; and
   an angular position indicating means for indicating the angular position in which the brace means is located.

2. The device of claim 1 wherein said rail means is held in parallel spaced relation to the interior surface of the tubular object.

3. The device of claim 2 wherein the rail means comprises a pair of sliding arms each retained by the brace means in parallel spaced relation to one another.

4. The device of claim 3 wherein the sliding arms are retained by the brace means in parallel spaced relation to the interior wall of the tubular object.

5. The device of claim 4 wherein the brace means extends transversely across the interior surface of the tubular object.

6. The object of claim 5 wherein the tubular object has an interior diameter and the brace means has a length and said brace means length is less than said interior diameter of the tubular object.

7. The device of claim 6 wherein the brace means has opposed ends and said device further comprising bearing means mounted at said opposed ends, and such that said brace means is movable peripherally on the interior surface of the tubular object.

8. The device of claim 7 further comprising a lock means mounted to said brace means in said angular positions against the tubular object.

9. The device of claim 8 wherein the tubular object has an exterior peripheral surface, and the lock means locks the brace means in an angular position, the locking means further comprising a lock shoe adjacent said exterior peripheral surface and operatively connected to said brace means.

10. The device of claim 7 further comprising height adjustment means joined to said machining means mount for adjusting the height of the machining means relative to the platform means.

11. The device of claim 1 further comprising a rail locking means positioned on said platform means capable of locking the platform means at a longitudinal position on the rail means.

12. The device of claim 1 further comprising a machining means mounted on said machining means mount on said platform means.

13. A device for use in machining an interior surface of a generally tubular object comprising:
   a rail means extending interiorly through said tubular shaped object;
   a brace means positionable in a plurality of annular positions on the interior surface of the tubular object for fixing the rail means to the tubularly shaped object;
   a platform means movably mounted on said rail means to be interiorly traversable through said tubularly shaped object, said platform having a machining means mount object thereon; and
   a lock means mounted to said brace means in said angular positions against the tubular object, said lock means having a lock shoe adjacent said exterior peripheral surface and operatively connected to said brace means, at least two lock arms, each lock arm having an exterior end, a medial portion, and an interior end, said lock arm exterior end being connected pivotally to said lock shoe, said lock arm medial portion being connected pivotally to said brace means, and said lock arm interior end being positionably connected to said brace means.

14. The device of claim 13 wherein the interior end of the lock arm is moved away from the brace means to tighten the lock shoe against the exterior peripheral surface of the tubular object and the interior end of the lock arm is moved away from the brace means to loosen the lock shoe against the exterior peripheral surface of the tubular object.

15. The device of claim 14 wherein the interior end of the lock arm is operatively connected to a lock screw extending generally radially outwardly from the brace means.

* * * * *